United States Patent [19]  [11] 4,090,196
Stevenson, Jr.  [45] May 16, 1978

[54] INVERSE GAIN MODULATOR

[75] Inventor: Howard R. Stevenson, Jr., Herkimer, N.Y.

[73] Assignee: General Electric Company, Utica, N.Y.

[21] Appl. No.: 427,760

[22] Filed: Dec. 20, 1973

Related U.S. Application Data

[63] Continuation of Ser. No. 104,636, Jan. 7, 1971, abandoned.

[51] Int. Cl.² ............................ G01S 7/38; G01S 9/02; G01S 9/56; H04K 3/00
[52] U.S. Cl. .................................. 343/5 R; 343/18 E; 343/6.8 R
[58] Field of Search .............. 343/5 R, 6.8 R, 6.8 LC, 343/18 E

[56] References Cited

U.S. PATENT DOCUMENTS

| | | | |
|---|---|---|---|
| 2,790,073 | 4/1957 | Curtis | 343/5 R |
| 3,357,013 | 12/1967 | Hart | 343/5 R |
| 3,484,784 | 12/1969 | McLeod, Jr. | 343/5 R |
| 3,685,050 | 8/1972 | Cartwright | 343/6.8 R |
| 3,845,482 | 10/1974 | Jirousek et al. | 343/18 E |

Primary Examiner—Malcolm F. Hubler

[57] ABSTRACT

In a transponder having first and second antennas an inverse gain modulator is provided. The inverse gain modulator comprises a power-responsive balance circuit coupled to the two antennas. The power level of the output signal returned by the second antenna is inversely related to the power level of the signal received by the first antenna.

9 Claims, 4 Drawing Figures

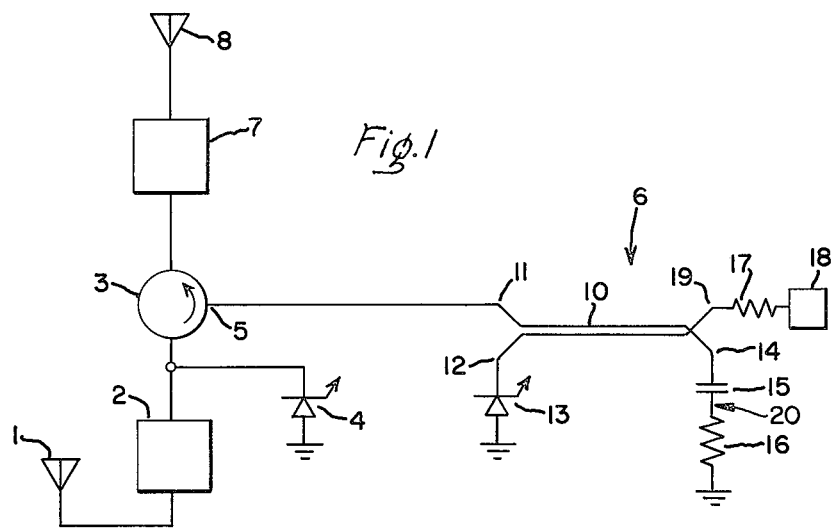
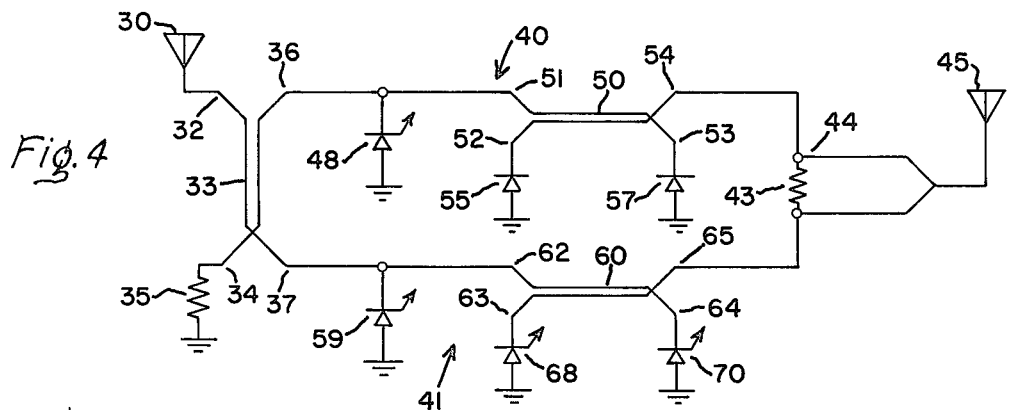
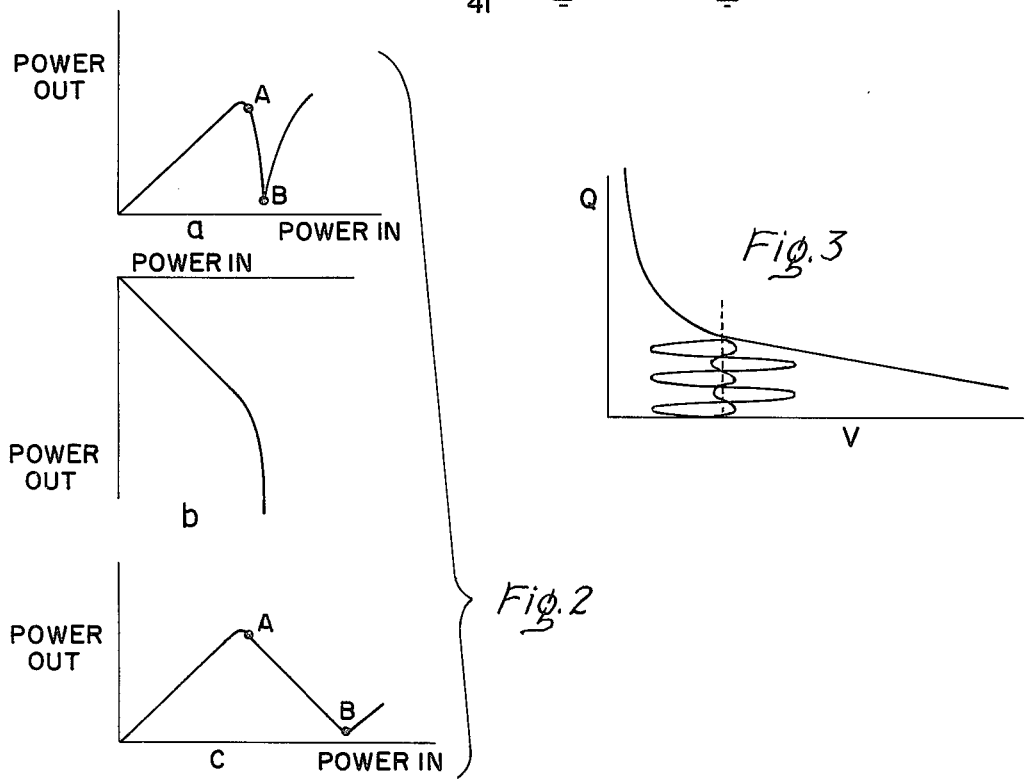

INVERSE GAIN MODULATOR

CROSS-REFERENCE TO RELATED APPLICATION

This application is a continuation of application Ser. No. 104,636, filed on Jan. 7, 1971, now abandoned, in the name of the applicant named herein and entitled "Inverse Gain Modulator".

BACKGROUND OF THE INVENTION

This invention relates to transponders, and more particularly, to transponders including means for modulating the level of power produced thereby.

A transponder is a device that produces an output signal in response to an incoming signal. One form of transponder is a system for providing false returns from an object to a radar system. A conventional technique for providing false azimuth information to radar systems is inverse gain modulation. In utilizing this technique, a radar pulse is transmitted, the signal is received by an aircraft, reproduced and returned to the radar system. The system produces a returned signal having a peak level versus angular displacement corresponding to the lowest level versus angular displacement of the transmitted radar signal, and a lowest level corresponding to the peak level of the transmitted radar signal. This returned signal provides a flat, meaningless return in azimuth, denying the radar system angular position information. (It is noted that the signal returned by the electronic system is greater in magnitude than the return from the remainder of the aircraft, so that the radar system does not respond to actual returns from the skin of the aircraft.)

Prior systems implement the inverse gain technique by receiving incoming signals and storing them in a computer. The signals are analyzed for characteristics such as frequency and pulse repetition frequency. In response to the analysis, a fabricated signal is generated and transmitted back to the radar system. Among the disadvantages of prior systems is the initial delay of response. In the brief time in which the computer is storing and analyzing incoming signals, the radar system may receive enough true returns to learn all it must about the position of the aircraft. Furthermore, such systems require the use of intermediate frequency and detector stages. The use of intermediate frequency stages limits the bandwidth of frequencies to which the system may respond and introduces further delay. Detector circuits also provide some delay and add to the complexity and cost of the system. In addition, if the radar operator changes operating frequency or "jitters" the pulse repetition frequency, the system may no longer be effective.

SUMMARY OF THE INVENTION

It is, therefore, an object of the present invention to provide a system for providing false returns to a radar system in which initial delays in response are eliminated.

It is a more specific object of the present invention to provide a system utilizing the inverse gain technique which provides output signals corresponding to all input signals received, including initial input signals.

It is a further object of the present invention to provide a system of the type described having a wider bandwidth than prior systems.

It is another specific object of the present invention to provide a system of the type described which is constructed such that delays in response to incoming signals are minimized.

It is another object of the present invention to provide a system of the type described in which incoming signals are processed at their incoming frequency, so that intermediate frequency stages are not needed.

It is yet a further object of the present invention to provide a system of the type described in which the incoming signal, or an amplified version of it, is processed, so that detector stages are not needed.

It is still another object of the present invention to provide an inverse gain modulating system which is less affected by changes in radar system operating frequency or pulse repetition frequency than prior systems.

It is also a further object of the present invention to provide a system of the type described which is simple in construction and efficient in operation.

Briefly stated, in accordance with the present invention, there is provided an inverse gain modulating system for providing an output signal having maximum and minimum levels versus angular displacement which do not respectively correspond to maximum and minimum levels versus angular displacement of an input signal. A power-responsive balance circuit is connected to an input antenna and to an output antenna. The balance circuit may be transmissive or reflective. The amount of power supplied by the balance circuit to the output antenna is modulated in response to the input power.

BRIEF DESCRIPTION OF THE DRAWINGS

The means through which the foregoing objects and features of novelty are achieved are pointed out with particularity in the claims forming the concluding portion of the specification. The invention, both as to its organization and manner of operation, may be further understood by reference to the following description taken in connection with the following drawings.

Of the drawings:

FIG. 1 is an illustration partly in schematic and partly in block diagrammatic form of one form of the present invention utilizing a reflective balance circuit;

FIGS. 2a and 2c are power out versus power in plots for an inverse gain modulator circuit of FIG. 1 with and without a varactor limiter respectively. While FIG. 2b is a power in versus power out plot for a varactor limiter;

FIG. 3 is a stored charge versus instantantous junction voltage plot for a typical varactor diode; and FIG. 4 is a representation of a further embodiment of the present invention in which a transmissive balance circit is used.

DESCRIPTION OF THE PREFERRED EMBODIMENTS

In FIG. 1, there is illustrated a system constructed in accordance with the present invention in which incoming signals are received by an antenna 1 and coupled to a radio frequency stage 2 which provides an input to a directional power separator 3. A limiter circuit 4, which in the present embodiment comprises a varactor diode, may be connected to the input of the directional power separator 3. The directional power separator 3 may comprise a well-known circulator or a directional coupler, and serves to separate power by directional flow.

More specifically, the directional power separator 3 comprises means for coupling incoming signals via a central terminal 5 to a power-responsive, reflective balance circuit 6, and further comprises means for coupling power reflected from the balance circuit 6 via the central terminals 5 to a radio frequency stage 7. The output of the radio frequency stage 7 is provided to a transmitting antenna 8 which provides returned signals to the source of the incoming signals.

The balance circuit 6 may comprise any balance circuit whose degree of balance or unbalance is related to power applied thereto. This, for example, could comprise a bridge circuit having a power-responsive element such as a power-responsive resistor. Preferably, the balance circuit should have a sharp null point for reasons explained below. In the present embodiment, a well-known quadrature hybrid 10 is utilized. The quadrature hybrid is a preferable form of balance circuit because it presents a low loss, wideband response and introduces less delay into the operation of the system than would many other components. The quadrature hydrid 10 has an input port 11, output port 19, and other ports 12 and 14. As is well-known of a quadrature hybrid, quadrature powers appearing at its other ports add out of phase at its input port and add in phase at its output port. A further characteristic of a quadrature hybrid is that equal loads at its other ports, even if mismatched to the hybrid characteristic impedance, reflect power at its input port to its output port.

The input port 11 of the quadrature hybrid 10 is coupled to the central terminal 5 of the directional power separator 3. A precision load 17 is connected between a source of bias input 18 for the varactor diode 13 and the output 19. The other ports 12 and 14 are terminated by a varactor diode 13, and a reactance circuit 20 comprised of a capacitor 15 and resistor 16 connected in series, respectively. This arrangement provides for the most convenient biasing of the varactor diode 13. Alternatively, the reactance circuit 20 may terminate the port 12, and the varactor diode 13 may terminate the port 14.

OPERATION OF THE CIRCUIT

Incoming signals are received by the antenna 1 and coupled to the radio frequency stage 2 which may amplify the incoming signal and also amplitude or phase modulate the incoming signal in accordance with standard electronic countermeasures techniques. Incoming power is directed by the power separator 3 via the terminal 5 to the input port 11 of the quadrature hybrid 10.

The varactor 13 and its level of bias are selected so that at small input signal levels, the voltage swing is in the linear region of the stored charge, Q, versus voltage, V, characteristic of the varactor 13, plotted in FIG. 3. This bias level is illustrated by the intersection of the dotted line with the curve of FIG. 3. As the signal voltage swing increases with power, as illustrated by the supper-imposition of large and small input signals on the plot of FIG. 3, the varactor 13 enters the non-linear portion of the stored charge versus voltage characteristic. Thus, the capacity of the varactor diode 13 increases with input power level when it is driven into the nonlinear portion of the characteristic curve. The values of the series-connected resistor 16 and capacitor 15 which terminate the port 14 are chosen such that the reactance, or more particularly the RC value, is equal to that of the varactor diode 13 when the varactor diode 13 is driven at a high signal level. Thus, when low signal levels are applied to the input port 11, the quadrature hybrid 10 is unbalanced, and when the input signal reaches a peak valve, the quadrature hybrid is brought into balance. When the hybrid 10 is unbalanced, input power is reflected back to the input terminal 11. At peak power input levels, all of the incident power in is reflected from the input port 11 and absorbed by the precision load 17 which terminates the output port 19.

The power out versus power in characteristic for the balance circuit 6 is illustrated in FIG. 2a in units of decibels. It is noted that a sharp null is provided when the circuit is balanced. This null is quite useful because through the use of an appropriate limiter, an inverse gain modulator may be provided having a selectable curve between the points A to B of FIG. 2a. The difference between the points A and B defines the dynamic range of the inverse gain modulator. A power in versus power out plot for the varactor limiter 4, i.e. the varactor limiter characteristic, is illustrated in FIG. 2b. A power out versus power in plot is illustrated in FIG. 2c for a circuit utilizing the varactor limiter 4. Where similar power-responsive elements are utilized in the balance circuit 6 and limiter 4 the plot between points A and B has a slope of minus one, which is especially suited for providing a flat meaningless return in azimuth to a radar system.

FIG. 4 is a schematic illustration of a system constructed in accordance with the present invention operating in the transmissive mode. In other words, the level of power in determines the amount of power transmitted, rather than reflected, to the output antenna. Incoming signals are received by a receiving antenna 30 and supplied to input port 32 of a quadrature hybrid 33. The quadrature hybrid 33 is utilized as a power divider and could be replaced by other well-known power dividers, such as a tuning fork circuit. The quadrature hybrid 33 has an output port 34 terminating in a resistive load 35 and other ports 36 and 37 respectively coupled to first and second channels 40 and 41 respectively including phase shift quadrature hybrids 50 and 60. The outputs of the two channels are combined by a power combining circuit which in the present embodiment comprises a well-known tuning fork circuit 44 which includes a load 43 and provides an output to a transmitting antenna 45. If desired, radio frequency stages could be coupled in series with the antennas 30 and 45 as in the embodiment of FIG. 1.

Referring now in greater detail to the inverse gain modulator of FIG. 4, in the first channel 40, a varactor diode limiter 48 is connected to a point between the port 36 and the quadrature hybrid 50. An input port 51 of the hybrid 50 is coupled to the port 36 for receiving radio frequency energy input. Other ports 52 and 53 are terminated in back biased diodes 55 and 57 respectively. An output port 54 is coupled to the tuning fork circuit 44 to couple energy to the output antenna 45.

In the second channel, a varactor diode limiter 59 is coupled to a point between the port 37 and the quadrature hybrid 60. An input port 62 of the hybrid 60 is coupled to the port 37 to receive incoming radio frequency energy. Other ports 63 and 64 and termined by back biased varactor diodes 68 and 70 respectively. An output port 65 is coupled to the tuning fork circuit 44.

In operation, incoming power is divided into quadrature components by the quadrature hybrid 33 and supplied to the first and second channels 40 and 41. The limiters 48 and 59 operate in the same manner as the limiter 4 of FIG. 1. The quadrature hybrid 50 acts as a non-power responsive phase shifter, and the quadrature hybrid 60 acts as a power responsive phase shifter, shifting the phase of power supplied thereto as to function of input power. Output power from the two channels 40 and 41 is combined by the tuning fork circuit 44. The proportion of output power dissipated by the load 43 to that supplied to the output antenna 45 is determined by the relative phases of power supplied from the channels 40 and 41, and hence by input power from the antenna 30. Thus the channels 40 and 41 and the power combining circuit 44 comprise a power-responsive balance circuit.

Of course, many other different configurations could be provided. For example, the dynamic range of the embodiment of FIG. 4 could be doubled by coupling entire circuits constructed in accordance with FIG. 4 between the output port 54 and 65 of the phase shifter quadrature hybrids 50 and 60 respectively and the tuning fork 44. Each of these entire circuits would be cascaded with a limiting amplifier.

Other modifications are possible, too. For example, in a transmissive mode, a well-known four-leg bridge having a power-responsive element could be provided, with the unbalance signal being coupled to an output antenna. While such an embodiment would generally of necessity include components which would limit bandwidth of the circuit, and also introduce losses over that which are obtained through the use of quadrature hybrids, such a circuit would still provide the desired operation. Thus, the present invention provides an inverse gain modulator in which a power-responsive balance circuit is utilized in a transmissive or reflective mode to provide an output signal varying with an input signal. Of course, it should be noted that other than pure linear functions could be provided, but the linear function is the most useful one.

What is claimed as new and desired to be secured by Letters Patent of the United States is:

1. An inverse gain modulator comprising in combination,
   (a) a directional power separator having input, output and central terminals;
   (b) means for receiving input energy connected to the input terminal of said directional power separator;
   (c) means for transmitting output energy connected to the output terminal of said directional power separator;
   (d) a quadrature hybrid having an input port coupled to said central terminal of said directional power separator, an output terminal terminated in a precision load and biasing input, and first and second other terminals respectively terminated by a varactor diode and a reactance circuit, said varactor diode being biased by said bias input, whereby the amount of power reflected by said quadrature hybrid and coupled by said directional power separator to said output transmitting means is a function of input power.

2. A system according to claim 1 in which a limiter is connected to the input terminal of said directional power separator.

3. A system according to claim 2 in which said limiter comprises a varactor diode.

4. In a circuit for receiving an input signal and for providing an output signal having stronger portions corresponding to weaker portions of the input signal and having weaker portions corresponding to stronger portions of the input signal, the combination comprising:
   a quadrature hybrid having an input port, an output port and first and second other ports;
   a varactor diode connected to terminate said first other port;
   a reactance circuit connected to terminate said second other port, said hybrid thus being arranged to operate in a reflective mode, the characteristics of said reactance circuit being selected relative to the characteristics of said varactor diode such that the loading provided thereby is unbalanced for input signals of a predetermined amplitude and is balanced for input signals of a relatively higher amplitude; and
   a circulator coupled to said input port for feeding said input signal to said hybrid and for feeding reflected energy, forming said output signal, away from said hybrid.

5. The system according to claim 4 further comprising a second varactor diode connected to said circulator on the input side thereof to limit said input signal.

6. In a circuit for receiving an input signal and for providing an output signal having stronger portions corresponding to weaker portions of the input signal and having weaker portions corresponding to stronger portions of the input signal, the combination comprising:
   a power divider having an input port for receiving the input signal and first and second other ports;
   a power-responsive balance circuit including first and second circuit channels respectively including first and second quadrature hybrid circuits each having an input port respectively coupled to the first and second other ports of said power divider, said first quadrature hybrid having first and second other ports each terminated by a back-biased diode and further having an output port, said second quadrature hybrid having first and second other ports each terminated by a varacter diode and further having an output port; and
   power combining means coupled to said output ports of said first and second quadrature hybrids for providing said output signal.

7. A system according to claim 6 further comprising first and second varactor diode limiters each respectively coupled to the input ports of said first and second quadrature hybrids.

8. A system for receiving an rf input signal and transmitting an rf output signal of the same frequency comprising in combination:
   quadrature hybrid circuit means connected to receive said input signal and to generate said output signal in response thereto: and
   loading means provided at at least two ports of said quadrature hybrid circuit means, said loading means constructed and arranged such that the relative loading at said two ports is unbalanced for input signals of a predetermined amplitude and is balanced for input signals of a relatively higher amplitude whereby the amplitude of said output signal is varied inversely with respect to the amplitude of said input signal.

9. A system for receiving an rf input signal and transmitting an rf output signal in response thereto comprising in combination:
   signal dividing means for dividing said input signal into first and second divided input signals;

first quadrature hybrid circuit means connected to receive said first divided input signal and operable to shift the phase of said signal by substantially a constant amount;

second quadrature hybrid circuit means connected to receive said second divided input signal and operable to shift the phase of said signal by an amount dependent on the amplitude of said signal; and means for combining said phase shifted signals to provide an output signal having a frequency equal to the frequency of said input signal and having an amplitude varying inversely with respect to the amplitude of said input signal.

* * * * *